W. S. THOMSON.
PIPE WRENCH.
APPLICATION FILED NOV. 1, 1913.
1,122,335.
Patented Dec. 29, 1914.
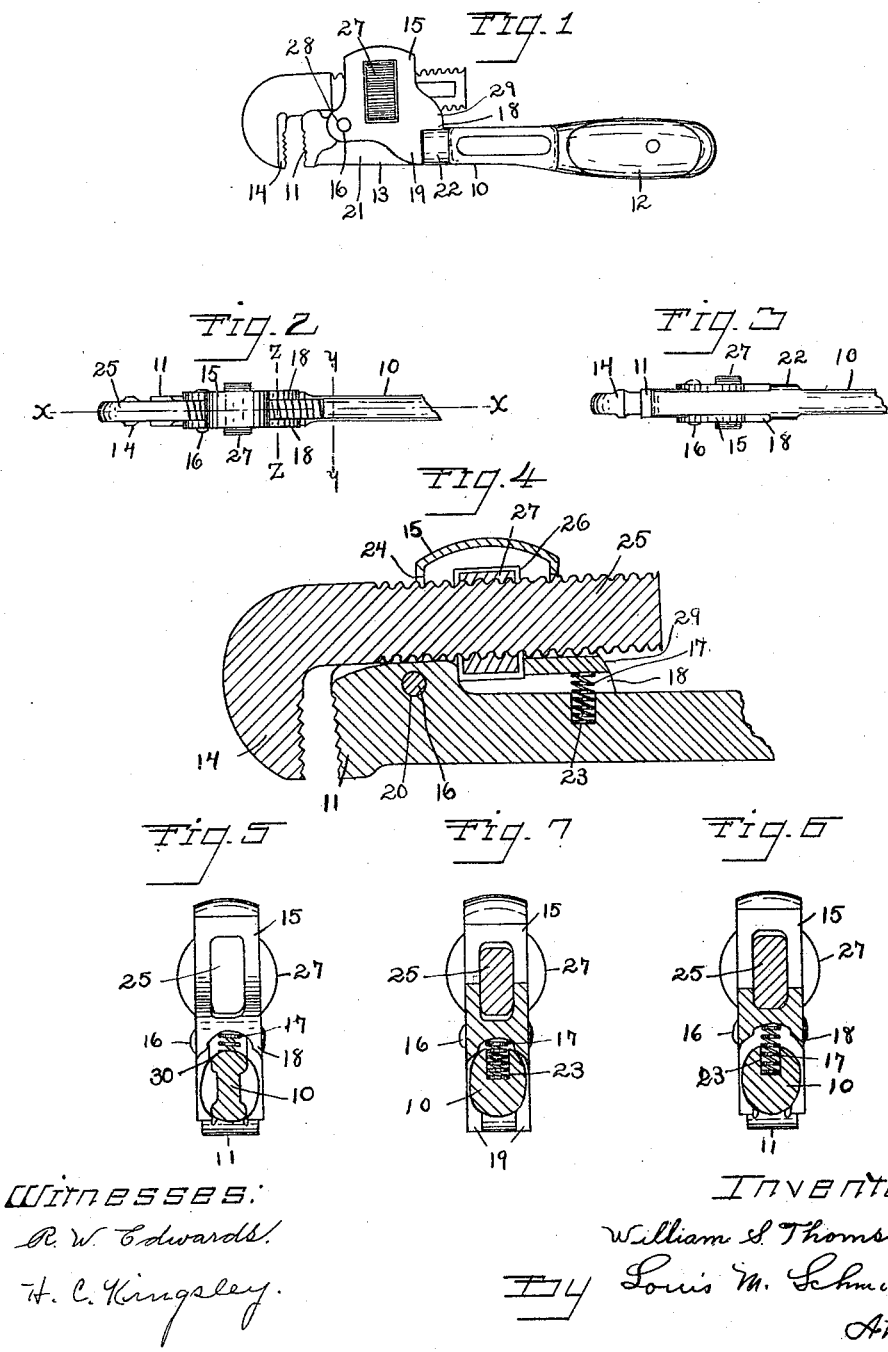

UNITED STATES PATENT OFFICE.

WILLIAM S. THOMSON, OF PLANTSVILLE, CONNECTICUT, ASSIGNOR TO THE H. D. SMITH & COMPANY, OF PLANTSVILLE, CONNECTICUT.

PIPE-WRENCH.

1,122,335.   Specification of Letters Patent.   Patented Dec. 29, 1914.

Application filed November 1, 1913. Serial No. 798,666.

*To all whom it may concern:*

Be it known that I, WILLIAM S. THOMSON, a citizen of the United States, residing at Plantsville, in the county of Hartford and State of Connecticut, have invented certain new and useful Improvements in Pipe-Wrenches, of which the following is a specification.

My invention relates to improvements in pipe wrenches, and the object of my improvement is to produce a pipe wrench in which the spring for positioning the movable jaw is protected and in a manner that is effective and reliable.

In the accompanying drawing:—Figure 1 is a side elevation of my improved pipe wrench. Fig. 2 is a plan view of the same, the handle being in part broken away. Fig. 3 is a bottom view of the same. Fig. 4 is a sectional view and on an enlarged scale on the line $x$ $x$ of Fig. 2. Fig. 5 is a sectional view on the line $y$ $y$ of Fig. 2. Fig. 6 is a sectional view on the line $z$ $z$ of Fig. 2. Fig. 7 is a similar view with the parts moved from the position shown in Fig. 6.

My pipe wrench comprises a fixed member 10 having a jaw 11 at one end, a handle 12 at the other end, and a shank 13 intermediate the said ends, and a movable jaw 14 that is slidably and adjustably housed in a rocking frame 15 and which latter is pivotally mounted on the shank 13 by means of a pin 16. A spring 17 positioned in the shank 13 and engaged with the rocking frame 15 tends to hold the jaws 11 and 14 in the closed position. Wings 18 on the rocking frame 15 inclose the spring 17 and protect the same from accidental injury. The hole 20 in the shank 13 for the pivotal pin 16 is adjacent the jaw 11 and the said shank is finished for an appreciable distance on the sides adjacent and rearwardly of the said hole 20 suitably to slidably enter between the depending flanges 19 on the rocking frame 15 as shown at 21. At the rear end of the finished portion 21 there are side lugs 22 on the shank 13 that engage with the flanges 19 and thereby limit the movement thereof when the rocking frame 15 is tilted to the closed position. The side lugs 22 are finished off in rounded and approximately cylindrical form, as shown in Figs. 6 and 7 and combine to form a reinforcement for the shank 13.

The spring 17 has its lower end housed in a well 23 in the shank 13, and which extends appreciably into the body of the said shank, and which well 23 is positioned in the portion of the shank that is reinforced by the lugs 22. The said body portion extends rearwardly in the form of a bearing lug 29 over the hole 23 suitably to engage with the upper end of the spring 17, and serves as the means of engagement of the said spring 17 and the rocking frame 15. Because of the rounded character of the side walls of the shank 13 and stop lugs 22 at the well 23 and spring 17 I find that I can drop downwardly the side walls of the bearing lug 29 in the form of wings 18, already mentioned, so as to overhang the adjacent upper portion 30 of the said shank, and inclose the spring 17. The said wings accordingly serve to protect the spring.

The rocking frame 15 is a shell-like structure having the body portion provided with a longitudinal slot 24 in which is positioned the screw threaded shank 25 of the usual form and connected with the movable jaw 14, and also provided with the usual crosswise slot 26 in which is positioned the nut 27 engaged with the said shank 25, and the depending flanges 19 depend downwardly from the said body portion. The front ends of the flanges 19 have holes 28 that are engaged with the pivotal pin 16, and the rear ends are opposed to the lugs 22, as already mentioned. Normally, the jaws are held in the closed position by the spring and in this position the spring is full open, as shown in Figs. 5 and 6. In this position it will be noted that the wings 18 extend downwardly sufficiently to cover the portion of the spring 17 that extends upwardly above the well 23. In the other extreme position, as shown in Fig. 7, the spring 17 is for the most part housed in the well 23 and the wings 18 are in abutment with the upper portion of the lugs 22. Accordingly, the wings 18 are of such extent as to always protect the spring 17 in the manner described. As shown, the wings 18, flanges 19 and body portion of the rocking frame 15 are finished off on the lateral faces on each side in one plane. Furthermore, it will be noted that the wings 18 are positioned at the lower outer corner of the rocking frame 15, and therefore serve to reinforce this portion of the frame, which is a distinct advantage, because, as is found in practice, this is a particularly weak part of the frame and the part that is likely to give way first under heavy strain. The wings also coöperate in positioning the upper end of the spring.

The construction described is such as to permit making the handle member by the drop forging process.

The portion of the shank having the well 23 and the side lugs 22 is rounded as mentioned and actually as shown is of oval formation, with the major axis vertical, with the well 23 at the middle and upper portion, and this form is suitable to be drop-forged in dies entire in an ordinary manner.

The wings 18 on the rocking frame 15 are as shown downward extensions of side flanges extending rearwardly from the said rocking frame 15, and which are bridged by the bearing lug 29. The lower surfaces of the wings 18 are rounded as shown to conform approximately to the rounded form of the shank opposed to the same as described, so that the extreme outer lateral edges thereof are appreciably below the inner portions of the same, as will be noted in Figs. 5, 6, and 7. It is because of the drop permitted in the said lateral edges by the rounded construction described that a positive housing and protection of the spring 17 is insured, even with the maximum opening of the spring that is allowed in the operation of the wrench.

I claim as my invention:—

A pipe wrench comprising a fixed member having a jaw at one end, a handle at the other end, and a shank intermediate the said ends, a rocking member pivotally mounted on the said shank and operatively housing a movable jaw, the said shank having a well for housing a spring and the said rocking member having a rearwardly extending lug overhanging the said well, a spring housed in the said well, lugs on the sides of the said shank, one on each side of the said well, serving to reinforce the said shank and as stop lugs for the said frame, and having a curved upper surface adjacent the said well, and wings overhanging the said curved upper surface extending rearwardly from the side walls of the said frame, alongside the said rearwardly extending lug, and projecting below the same suitably to protect the said spring.

WILLIAM S. THOMSON.

Witnesses:
 G. R. BOND,
 E. H. GALPIN.

Copies of this patent may be obtained for five cents each, by addressing the "Commissioner of Patents, Washington, D. C."